United States Patent [19]

Masino

[11] Patent Number: 5,182,341

[45] Date of Patent: Jan. 26, 1993

[54] OLEFIN POLYMERIZATION METHOD

[76] Inventor: Albert P. Masino, 5934 Oak Grove Ct., Hamilton, Ohio 45011

[21] Appl. No.: 882,674

[22] Filed: May 14, 1992

Related U.S. Application Data

[62] Division of Ser. No. 516,754, Apr. 30, 1990, Pat. No. 5,126,302.

[51] Int. Cl.$^5$ .............................. C08F 4/44
[52] U.S. Cl. ................... 526/125; 526/124; 526/128; 526/351; 502/116
[58] Field of Search ............... 526/128, 124, , 125, 526/351

[56] References Cited

U.S. PATENT DOCUMENTS

| | | | |
|---|---|---|---|
| 3,135,809 | 6/1964 | Bosmajian | 502/114 |
| 4,283,515 | 8/1981 | Gibbs | 526/128 |
| 4,394,291 | 7/1983 | Hawley | 252/429 B |
| 4,503,159 | 3/1985 | Masino et al. | 502/111 |
| 4,544,716 | 10/1985 | Hawley | 526/119 |
| 4,675,303 | 6/1987 | Bacskai | 502/115 |
| 4,686,199 | 8/1987 | Tachikawa et al. | 502/104 |
| 4,727,049 | 2/1988 | Furuhashi et al. | 502/115 |
| 4,737,481 | 4/1988 | Murata et al. | 502/119 |
| 4,792,640 | 12/1988 | Mehta | 568/851 |
| 4,857,613 | 8/1989 | Zolk | 526/128 |
| 5,126,302 | 6/1992 | Masino | 502/116 |

FOREIGN PATENT DOCUMENTS

| | | |
|---|---|---|
| 115833 | 8/1984 | European Pat. Off. . |
| 136112 | 4/1985 | European Pat. Off. . |
| 136113 | 4/1985 | European Pat. Off. . |
| 140536 | 5/1985 | European Pat. Off. . |
| 193281 | 9/1986 | European Pat. Off. . |
| 299712 | 1/1989 | European Pat. Off. . |
| 63-277202 | 11/1988 | Japan . |
| 1-60611 | 3/1989 | Japan . |
| 1-213311 | 8/1989 | Japan . |
| WO892446 | 3/1989 | PCT Int'l Appl. . |
| 2184448 | 6/1987 | United Kingdom . |

Primary Examiner—Joseph L. Schofer
Assistant Examiner—David Wu
Attorney, Agent, or Firm—Marshall, O'Toole, Gerstein, Murray & Bicknell

[57] ABSTRACT

A method of polymerizing one or more 1-olefins using a catalyst system incorporating a solid catalyst component is disclosed wherein the catalyst component is prepared by contacting, in the presence of an inert liquid hydrocarbon, silica, a soluble organomagnesium compound, an SiCl$_4$ magnesium fixing agent, an alcohol, TiCl$_4$, and a carboxylic acid derivative, followed by extraction with a TiCl$_4$ containing extraction liquid. The inventive catalyst system allows ready control of product molecular weight by control of hydrogen concentration in the reactor, and allows the production of high MI or MF polymers at high productivities.

24 Claims, No Drawings

OLEFIN POLYMERIZATION METHOD

CROSS-REFERENCE TO RELATED APPLICATION

This is a division of copending, commonly assigned application Ser. No. 07/516,754 filed Apr. 30, 1990, now U.S. Pat. No. 5,126,302 issued Jun. 30, 1992, the entire disclosure of which is incorporated herein by reference.

BACKGROUND OF THE INVENTION

1. Field of the Invention

This invention relates generally to olefin polymerization catalysts and methods and, more particularly, this invention relates to a method of polymerizing one or more 1-olefins using a catalyst system including a solid catalyst component in combination with a cocatalyst.

2. Description of Related Technology

The use of chain transfer agents such as gaseous hydrogen to control molecular weight of polymers of 1-olefins is well known. In general, the presence of hydrogen during polymerization of 1-olefins effects a reduction in average molecular weight of product polymer. Polymerization catalysts vary in their response and sensitivity to the presence of hydrogen.

In general, melt index (MI) or, in the case of propylene homopolymers and copolymers, melt flow (MF), both as measured by ASTM D-1238, are qualitative indications of polymer molecular weight. In general, molecular weight is inversely related to the MI or MF value of a polymer.

It is desirable to prepare polymers using a catalyst system whereby the MI or MF (and thus, molecular weight) is controllable by selection of hydrogen pressure in the polymerization reactor, and in many cases, it is desirable to produce polymers having high melt flow values. In propylene polymerization, however, it is often necessary to resort to partial degradative processes such as visbreaking of polymers in order to increase MF. Visbreaking may be disadvantageous in that it is by definition an additional, costly step and may result in loss of polymer crystallinity, narrowing of polymer molecular weight distribution, and degradation of other product properties. Thus, it is desirable to prepare polypropylene and other polyolefins having a desired melt flow value directly in a single reactor without the necessity for a degradative visbreaking step.

Further, some prior catalyst systems which allow control of MF and achievement of high MF values do not produce polymer at an acceptably high productivity level.

In at least one known prior catalyst system which allows regulation of polymer molecular weight by means of the use of hydrogen or other regulators, a solid catalyst precursor is modified by contact with a molar excess of a gaseous chlorinating agent ($Cl_2$ or HCl) in a liquid medium, with the resulting solid carrier being isolated by removal of the liquid phase.

The use of a gaseous chlorinating agent in catalyst preparation may require the use of an excess of the gaseous material to obtain effective gas/liquid/solid contact. The gaseous agent has only limited solubility in the reaction medium, and the use of a gaseous reactant can result in control problems.

Furthermore, such procedures typically include several solid intermediate and product isolation steps, and the resulting catalytic products may exhibit only limited sensitivity to the presence of hydrogen during polymerization, and may not produce product polymer having a high melt flow value.

SUMMARY OF THE INVENTION

It is an object of the invention to overcome one or more of the problems described above.

According to the invention, a solid catalyst component useful in combination with a suitable cocatalyst for polymerizing one or more 1-olefins is prepared by a method wherein particulate, porous silica is contacted, in the presence of an inert liquid hydrocarbon, with a selected hydrocarbon soluble organomagnesium compound, with the resulting product being contacted with an $SiCl_4$ magnesium fixing agent at a moderate temperature. The resulting product is contacted with a selected alkanol in a molar ratio of alkanol to magnesium in the range of about 1:1 to about 5:1, inclusive, and the resulting product is contacted with $TiCl_4$. A selected carboxylic acid derivative is introduced after alkanol addition and before or after the introduction of $TiCl_4$.

The resulting product is extracted with a $TiCl_4$ extraction liquid at a temperature greater than about 100° C. for about 1 to 3 hours to produce a solid product, which is then isolated and washed with an inert liquid hydrocarbon to remove free $TiCl_4$ therefrom.

The resulting solid catalyst component is combined with a suitable cocatalyst to form a catalyst system useful in polymerizing one or more 1-olefins. For use in propylene polymerization, the cocatalyst is preferably a combination of a trialkylaluminum compound and an alkylalkoxysilane or alkoxysilane.

The invention comprehends a method of making polymers using the catalyst system as well as the solid catalyst component and the catalyst system.

Other objects and advantages of the invention will be apparent to those skilled in the art from a review of the following detailed description taken in conjunction with the appended claims.

DETAILED DESCRIPTION

The first step in preparing the solid catalyst component of the invention is to contact particulate, porous silica of the formula $SiO_2 \cdot aAl_2O_3$, wherein a is 0 to 2, inclusive, with a selected hydrocarbon-soluble organomagnesium compound in the presence of an inert liquid hydrocarbon, preferably an alkane. Suitable hydrocarbons include pentanes, hexanes, heptanes, gasolines, and cyclohexane. A preferred hydrocarbon is n-heptane.

The silica is preferably free of alumina (i.e. a is zero) and water content is not critical. The silica may be used as received from the supplier and, as such, typically has a water content of about 4 wt. %. Calcining is neither necessary nor desired. Also, the silica preferably is not treated to modify the surface thereof.

Although physical properties of the silica are not critical, it is preferred to use shape. imparting, finely divided silica having an average particle diameter in the range of 1 to 1000 microns, and preferably 5 to 500 microns, a pore volume in the range of 0.3 to 5 cc/g, preferably 1.0 to 3.0 cc/g, and a specific surface area of 100 to 1000 $m^2/g$, preferably 200 to 500 $m^2/g$.

The organomagnesium compound is a hydrocarbon soluble dialkylmagnesium compound of the formula $MgRR^1$, an alkoxymagnesium halide of the formula ROMgX, a dialkoxymagnesium compound of the formula Mg(OR)(OR$^1$), or an alkylalkoxymagnesium compound of the formula R(OR$^1$)Mg, wherein R and R$^1$ are the same or different substituted or unsubstituted C$_2$-C$_{12}$ (preferably C$_2$ to C$_8$): alkyl groups, and X is I, Br, or Cl.

Hydrocarbon-soluble species of dialkoxymagnesium compounds of the formula Mg(OR)(OR$^1$) include those wherein R and R$^1$ are relatively long or branched, i.e. those in which R and R$^1$ are linear alkyl radicals having 6 to 12 carbon atoms or a branched alkyl radical having 5 to 12 carbon atoms, especially alkoxide groups corresponding to the general formula R$^5$CH(R$^6$)CH$_2$O wherein R$^5$ is a hydrogen atom and R$^6$ is C$_2$-C$_{10}$ alkyl radical, or R$^5$ is a C$_1$-C$_0$ alkyl radical and R$^6$ is a methyl radical.

Dialkylmagnesium compounds and alkoxymagnesium chlorides are preferred, with particularly preferred compounds being butyloctylmagnesium, 2-methylpentoxymagnesium chloride, and 2-ethylhexoxymagnesium chloride.

Alkoxymagnesium halides and methods for their preparation are disclosed in Mehta U.S. Pat. No. 4,792,640 (Dec. 20, 1988).

If desired, the dialkylmagnesium compound may take the form of a dialkylmagnesium-trialkylaluninum complex such as those commercially available under the trade designation "Magala" from Texas Alkyls.

In the case of the alkoxymagnesium halides, the alkyl group attached to the magnesium atom through the oxygen linkage is preferably alkyl-substituted, most highly preferably methyl-substituted, to assist in solubility in hydrocarbons.

The molar ratio of the organomagnesium compound to silica is generally in the range of about 0.1:1 to about 1:1, and preferably about 0.15:1 to about 0.5:1, inclusive, and typically about 0.25:1, about 0.33:1, or about 0.5:1.

The step of contacting the magnesium compound and silica is typically carried out at about 10°-20° C., preferably at 20°-100° C., and the contact mixture is maintained at 20°-140° C., preferably 60°-90° C., for 0.5-5 hours, preferably 1-2 hours.

The solid contact product of silica and the organomagnesium compound is then contacted with a magnesium fixing agent consisting of or containing SiCl$_4$ at a moderate temperature, preferably at a molar ratio of magnesium fixing agent to magnesium of at least about 1:1, although less than an equimolar ratio of fixing agent to magnesium is feasible. Large excesses of magnesium fixing agent to magnesium are not preferred, for economic reasons, since the effectiveness of the catalyst is not appreciably improved at higher ratios.

Preferably, the magnesium fixing agent includes SiCl$_4$ in combination with HSiCl$_3$, H$_2$SiCl$_2$ (in liquid or gaseous form), or gaseous HCl. HSiCl$_3$ is preferred.

At atmospheric pressure and room temperature, H$_2$SiCl$_2$ is a gas, and may be used as such. However, if desired, H$_2$SiCl$_2$ may be used at a sufficiently low temperature to maintain it in the liquid state.

Preferably, SiCl$_4$ comprises a major molar proportion of the magnesium fixing agent mixture, highly preferably about 85 mole percent. When HCl or gaseous H$_2$SiCl$_2$ is used in combination with SiCl$_4$, the gas is added in a small excess over the preferred 15 mole percent proportion, since mixing of gaseous HCl or H$_2$SiCl$_2$ with the solid/liquid contact medium is less than completely efficient.

The preferred magnesium fixing agent is a combination of SiCl$_4$ and HSiCl$_3$, with HSiCl$_3$ in minor molar proportion, highly preferably in a molar ratio of 85:15.

It is important that contacting of the silica-organomagnesium contact product with the magnesium fixing agent be conducted at a moderate temperature i.e. one less than about 70° C., preferably less than about 50° C. If the contacting temperature is too high, the advantageous hydrogen sensitivity and activity characteristics of the catalyst will suffer.

A contacting temperature of about 40° C. is preferred. The upper temperature limit is readily empirically determinable by those skilled in the art, guided by the present disclosure, by observation of a detrimental effect on selectivity for isotactic propylene polymers (i.e. by a decrease in %HI), for example, or by observation of a decrease in activity resulting from a high magnesium fixing step temperature, relative to results obtained with a 40° C. fixing step temperature. The reaction between the fixing agent and the silica-organomagnesium contact product is exothermic, and in practice the mixture is allowed to warm to the desired contacting temperature after addition of the fixing agent. If necessary, heat may be applied to bring the mixture to the desired temperature.

If one of the components of the fixing agent has an atmospheric boiling point of less than the desired temperature, a reflux condenser should be used to condense and return vaporized fixing agent components to the contact mixture.

The magnesium fixing mixture is maintained at the desired temperature for about 0.5 to 5 hours, preferably about 0.5 to 1 hour.

It is preferred, but not necessary, to isolate the solid product of the magnesium fixing step from the hydrocarbon medium and to wash the solid product with clean hydrocarbon liquid. It is highly preferred to isolate and wash the magnesium fixing step product in the case wherein the magnesium fixing agent comprises a mixture of SiCl$_4$ and HSiCl$_3$, but it is not strictly necessary to wash the product or even to isolate it from the hydrocarbon medium. When the product is not isolated or washed, the catalytic catalyst preparation procedure is simplified.

The step of contacting the solid silica-organomagnesium contact product with SiCl< is believed to be effective in depositing or fixing the magnesium compound on the silica surface in order to facilitate the preparation of a solid catalyst component with the desirable attributes of the invention. This step is thus referred to herein as a "magnesium fixing" step, and the SiCl$_4$ reactant is referred to herein as a "magnesium fixing" agent for convenience. The scope of the invention is not to be limited by this theory or characterizing language, however.

Following the magnesium fixing step, the product thereof is contacted with a C$_1$-C$_8$ alkanol in a molar ratio of alkanol to magnesium in the range of about 1:1 to about 5:1, inclusive, preferably in the range of about 2.5:1 to 3.5:1, and highly preferably about 3:1. Ethanol is a preferred alkanol. This step is carried out at about 20°-140° C., preferably about 70°-90° C., for about 0.2 to 5 hours, preferably about 1.2 hours. It is believed that the alcohol functions to swell the fixed magnesium-silica contact product to open the crystalline lattice thereof for enhanced contact with subsequently added TiCl$_4$.

Subsequently, titanium tetrachloride is added, preferably at room temperature, and the resulting mixture is maintained at about 10°–150° C. for about 0.5 to 5 hours, and preferably about 1–2 hours. TiCl$_4$ is added in a molar ratio to magnesium of about 2:1 to 20:1, and preferably about 4:1 to 8:1.

A carboxylic acid derivative selected from alkyl, aryl, and cycloaklyl carboxylic acid dichlorides, anhydrides and diesters, preferably a phthalic acid derivative of the formula

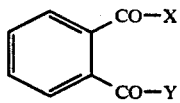

wherein X and Y together are oxygen or X and Y are each chlorine or $C_1$–$C_{10}$ alkoxy is introduced to the contact mixture before or after, or with, the TiCl$_4$. X and Y are preferably butoxy (i.e. the phthalic acid derivative is dibutylphthalate, DBP). The molar ratio of the phthalic acid derivative or other diester to magnesium is in the range of about 0.01:1 to about 1:1, preferably from about 0.1:1 to about 0.4:1, and highly preferably from about 0.25:1 to about 0.35:1.

When the preferred dibutyl phthalate is added after the TiCl$_4$, the preferred addition temperature is about 80° C., with the reaction temperature then raised to about 100° C. for one hour. If the dibutyl phthalate is added prior to introduction of TiCl$_4$, it can readily be carried out at room temperature, followed by increasing the reaction temperature to about 100° C. for one hour.

Following the foregoing steps, the resulting solid product is isolated from the hydrocarbon liquid, and subjected to extraction with a titanium tetrachloride-containing extraction liquid at a temperature in the range of 100°–150° C., preferably at 115°–135° C., most preferably at 125° C. The extraction liquid may consist of TiCl$_4$, or may comprise a mixture of TiCl$_4$ and an alkylbenzene of not more than 12 carbon atoms, preferably ethylbenzene. The extraction step may be carried out in a single stage, multistage, or continuous extraction procedure, for from about 0.2 to about 5 hours, preferably for from about 1.5 to about 3 hours. The extraction liquid should contain at least about 5 vol. %, and preferably at least 10 vol. % titanium tetrachloride, and a total of from 10 to about 1000, preferably about 20 to about 800, and highly preferably about 40 to about 300 parts by weight of the extraction liquid should be used per 10 parts by weight of the solid product being extracted.

If the solid product is not subjected to the extraction step, very low activity and low selectivity of the catalyst will result. It is believed that the extraction step removes excess carboxylic acid derivative, leaving the appropriate titanium and magnesium active sites for which the acid derivative is an electron donor. The scope of the invention is not to be limited by this theory, however.

Finally, the solid product of the extraction step is washed with an inert hydrocarbon liquid, preferably an alkane such as those identified above, to remove free titanium tetrachloride from the product. Preferably, the product is washed until the hydrocarbon contains less than 2, and preferably less than 1, weight percent of TiCl$_4$.

The solid catalyst component of the invention is effective in combination with a suitable cocatalyst in polymerizing one or more 1-olefins to produce olefin homopolymers and copolymers. In ethylene polymerization, suitable cocatalysts include organoaluminum cocatalysts known in the art, specifically trialkylaluminum compounds and dialkylaluminum halides such as diethylaluminum chloride. The alkyl groups of such cocatalysts typically have 8 or less, and preferably 4 or less carbon atoms.

In propylene homopolymerization and copolymerization with other 1-olefins, the cocatalyst typically comprises an aluminum component of the formula $AlR^2_3$ wherein $R^2$ is an alkyl group of not more than 8, and preferably not more than 4 carbon atoms, and a silane component of the formula $R^3_n Si(OR^4)_{4-n}$ where $R^3$ is a saturated aliphatic, cycloaliphatic, and/or aromatic hydrocarbon radical of not more than 16, and preferably not more than 10 carbon atoms, $R^4$ is an alkyl group of not more than 15, preferably not more than 8, and highly preferably not more than 4 carbon atoms and n is 0 to 3, preferably 0 to 2, and most preferably 1 or 2.

Preferably, the atomic ratio of titanium from the solid catalyst component to aluminum from the aluminum component is from about 1:10 to about 1:2000, preferably from about 1:20 to about 1:300, and the molar ratio of the aluminum component to the silane component is from about 1:0.01 to about 1:0.8, preferably from about 1:0.02 to about 1:0.5.

The silane component is preferably a trialkoxyalkylphenyl silane or a dialkyldialkylphenyl silane, including trihexoxytoluyl silane and dimethoxyditoluyl silane, triethoxyphenyl silane, trimethoxytoluyl silane and diethoxyditoluyl silane.

In propylene polymerization, the preferred aluminum component is triethylaluminum (TEA), and the preferred species of silane is $R^3_2 Si(OR^4)_2$, preferably isobutylisopropyldimethoxy silane (IBIP).

The invention permits the preparation of homopolymers and copolymers, for example, binary or ternary copolymers, of propylene with minor amounts of other $C_2$–$C_{12}$ 1-monoolefins. Particularly suitable 1-olefin comonomers include ethylene, 1-butene, 4-methylpent-1-ene, 3-methylbut-1-ene, and 1-hexene. Other suitable comonomers are n-oct-1-ene, n-dec-1-ene and n-dodec-1-ene.

Polymerization can be carried out by any suitable method, including dry-phase polymerization, of the monomer or monomers at from about 20° to about 160° C., preferably from about 50° to about 120° C., under a pressure of from 1 to 100 bar, preferably at a pressure of from 20 to 70 bar, preferably under hydrogen partial pressure.

According to the invention, polyolefins, in particular propylene homopolymers and copolymers, are obtainable with readily controllable MI or MF, with high catalyst productivities. In propylene polymerization, the catalyst system of the invention exhibits very high hydrogen sensitivities, allowing ready control of product MF at high catalyst activity. The products typically are characterized as having high MF and high percent HI (heptane insolubles) characteristics.

For example, evaluation of the catalyst system of the invention in propylene polymerization has shown very high hydrogen sensitivity for catalysts with activities of more than 30,000 g/g-cat/hr. Typical polypropylene products exhibit 97.5 percent HI at 30 g/10 min MF, and greater than 99 percent HI in the 1.5 g/10 min MF range. Products having MF values of over 300 g/10 min have been prepared.

An interesting aspect of the solid catalyst component of the invention is the variability of the magnesium/titanium ratio in the catalyst depending upon the identity of the magnesium fixing agent and, to some extent, on the identity of the organomagnesium compound. In the preferred form of the catalyst, a very pronounced synergistic influence of the presence of $HSiCl_3$ on the $SiCl_4$ magnesium fixing agent, in terms of the catalyst's response to polymerization parameters, including the presence of hydrogen, is observed. In the preferred case, productivity as well as product MF increases as the amount of available hydrogen is increased. In general, dialkylmagnesium compounds produce solid catalyst components having somewhat higher productivity than the alkoxymagnesium halide containing catalysts which, however, produce products having high MF and percent HI values.

These and other aspects of the invention will be apparent from the following detailed examples.

EXAMPLES

The following specific examples will illustrate the practice of the invention and demonstrate advantages over comparative catalysts. The examples are not to be understood as limiting the scope of the invention.

EXAMPLE 1

Preparation and Testing of Catalysts Utilizing a Dialkylmagnesium Compound

A series of seven catalysts, designated A-G, utilizing butyloctylmagnesium (a dialkylmagnesium compound) and HCl or various magnesium fixing agents were prepared, and their titanium, magnesium, and silica contents, and in three cases chloride contents, determined. Each catalyst was tested in propylene homopolymerization, and productivity, product bulk density, melt flow value, percent heptane insolubles, and titanium content were determined utilizing procedures as described below.

Catalyst A

In a 4-neck, 250 mL round bottom flask equipped with a nitrogen purge, a heptane inlet, and a reflux condensor, a catalyst was prepared as follows.

5.0 grams Grace 332 silica ($SiO_2$) was charged to the flask. With stirring, butyloctylmagnesium (BOMAG, 31.7 mL of a 20 wt. % solution in heptane) was added slowly to the silica and the contents of the flask were contacted at reflux for 1 hour at 97° C., and then cooled to 40° C. 11.4 g HCl was bubbled slowly from a lecture bottle through the resulting mixture for 1.5 hours. A silica color change from off white to light yellow, and a temperature rise of about 15° C. upon addition of BOMAG to silica, were observed. 4.87 mL ethanol was added to the resulting mixture with stirring at room temperature, and refluxed for 1 hour at 97° C. The mixture was allowed to cool to less than 40° C. A color change from light yellow to white was observed. 22 mL $TiCl_4$ was added to the flask, with stirring, and warming was begun. Upon addition of $TiCl_4$, the solution turned medium yellow. 2.72 mL dibutylphthalate (DBP) was added at 80° C. upon which the solution appeared to become grainy and turned golden yellow. The temperature was raised to 100° C. for 1 hour. The contents of the flask were allowed to cool to less than 40° C. The supernatant liquid was pressured off and the solid product was transferred to an extractor for continuous extraction with $TiCl_4$/ethylbenzene extraction liquid (10 vol. % $TiCl_4$). The continuous extractor was jacketed in order to maintain a constant temperature in the extraction zone with a high temperature recirculating bath. After charging to the extraction zone, the solid was subjected to continuous extraction for 3 hours with the extraction zone kept at 120°-125° C., and the liquid volume above the solid was kept uniform at about twice the volume occupied by the solid. At the end of the extraction, heptane was used to wash and transfer the catalyst to a receiving flask, and the catalyst was then transferred into a dry box for further evaluation.

Catalyst B

This catalyst was prepared according to the procedure described in connection with Catalyst A, above, except that the BOMAG/silica mixture was refluxed for 30 minutes rather than 1 hour, and in place of the HCl, 3.2 mL of $SiCl_4$ was added to the silica/BOMAG mixture and contacted at 50° C. for 45 minutes. No temperature change or color change was noted. The added $SiCl_4$ was used in approximate 1:1 molar ratio with respect to magnesium. After addition of ethanol, a temperature rise from 36° to 70° C. was noted, and the solid was chalk white. After refluxing for 1 hour at 97° C., the mixture was cooled to less than 40° C. and left overnight with a nitrogen purge before 22 mL $TiCl_4$ was added. Reflux was started, and 3.78 mL DBP was added at 80° C.

Catalyst C

A catalyst was made following the procedure of Catalyst B, above, with the exception that after contacting the silicon tetrachloride/BOMAG/silica mixture at 50° C. for 45 minutes, the resulting solid product was washed twice with 70 mL heptane prior to addition of ethanol. The solid remained off-white in color until addition of $TiCl_4$, at which point the solid became tan with an olive green tinge. The solid turned yellow upon addition of DBP. The final product was medium brown in color.

Catalyst D

A catalyst was made according to the procedure of Catalyst C, above, except that instead of 3.2 mL silicon tetrachloride, 2.72 mL silicon tetrachloride was added followed by bubbling 3.9 grams HCl through the resulting mixture for 10 minutes, followed by two washings with 80 mL heptane. The final catalyst color was light caramel.

Catalyst E

A catalyst was made according to the procedure followed in preparation of Catalyst B, above, except that 2.83 mL $HSiCl_3$ was used in place of $SiCl_4$, with contact with stirring for 45 minutes at 33° C. Also, the solution was left overnight under nitrogen purge after the addition of $TiCl_4$ and DBP and refluxing. The final catalyst color was dark brown.

Catalyst F

A catalyst utilizing an 85:15 molar mixture of $SiCl_4$ and $HSiCl_3$ was prepared using the procedure of Catalyst B, above. The total magnesium fixing agent molar ratio to magnesium was about 1:1. 2.72 mL $SiCl_4$ and 0.45 mL HSiCl₃ were used. The final catalyst color was light mustard yellow.

needed to fill a 10 mL cylinder (without tapping), MF was determined by ASTM D-1238 at 2300C, and 96 HI was determined by continuous heptane extraction.

TABLE I

Effect of Treatment (X) on Catalyst Composition
SiO$_2$/BOMAG/X/EtOH/TiCl$_4$/DBP/(TiCl$_4$/EB Extraction)

| Catalyst | X | Composition, Wt. % | | | | Mg/Ti (Molar) |
|---|---|---|---|---|---|---|
| | | Ti | Mg | SiO$_2$ | Cl | |
| A | HCl | 3.16 | 6.52 | 46.9 | not determined | 4.1 |
| B | SiCl$_4$ | 4.10 | 5.99 | 49.5 | not determined | 2.9 |
| C | SiCl$_4$ + Wash | 2.52 | 4.63 | 32.7 | not determined | 3.6 |
| D | SiCl$_4$ + HCl + Wash | 5.79 | 4.49 | 34.8 | 13.8 | 1.5 |
| E | HSiCl$_3$ | 2.00 | 2.90 | 69.4 | not determined | 2.8 |
| F | SiCl$_4$ + HSiCl$_3$ | 5.00 | 5.80 | 26.5 | 26.6 | 2.3 |
| G | SiCl$_4$ + HSiCl$_3$ + Wash | 3.84 | 4.63 | 33.7 | 17.0 | 2.4 |

TABLE II

Polymerization Results

| Catalyst | Weight Cat. (g) | Productivity (g/g-cat/hr.) | Bulk Density (lb/ft$^3$) | Melt Flow (g/10 min.) | HI (wt. %) | Polymer Ti (ppm) |
|---|---|---|---|---|---|---|
| A | 0.010 | 5502 | 24.9 | 0.9 | 99.4 | 7.1 |
| B | 0.028 | 2341 | 25.4 | 2.2 | 98.7 | 5.6 |
| C | 0.0585 | 5603 | 18.2 | 1.9 | 98.9 | 3.2 |
| D | 0.0288 | 5042 | 21.2 | 5.7 | 97.8 | 7.9 |
| E | 0.030 | 870 | 15.8 | 0.8 | 93.6 | 35 |
| F | 0.0429 | 6300 | 19.0 | 12.1 | 97.2 | 7.4 |
| G | 0.0310 | 10927 | 23.0 | 1.4 | 99.3 | 3.3 |

Catalyst G

A catalyst was prepared utilizing the procedure of Catalyst F, above, except that 2.72 mL SiCl$_4$ and 0.4 mL HSiCl$_3$ were used and, after contacting for 40° C. for 1 hour, the solid product was washed twice with 70 mL heptane. The final catalyst color was greenish yellow.

Polymerization Testing

Each of the Catalysts A G, above, was tested for propylene homopolymerization using triethylaluminum (TEA, Akzo Chemicals) in a 25 wt. % heptane solution along with isobutylisopropyl dimethoxysilane (IBIP) in a molar ratio of TEA to IBIP of 10:1. The polymerizations were conducted in the bulk phase at a nominal temperature of 70° C. and a nominal reactor pressure of 460 psig.

Catalysts A, B, and E were tested in a one liter reactor using about 100 mL hydrogen. The remaining catalysts (except for Catalyst C, which was tested at a hydrogen pressure drop of 38 psig) were tested in a two liter reactor using hydrogen at a 70 psi pressure drop from a 300 mL container.

20 mL of heptane was added to the reactor at about 30° C. The TEA solution was added, followed by the IBIP solution solution. A weighed amount of catalyst was then added. The reactor was then closed and purged with propylene, hydrogen added, and the polymerization run started. The reactor was maintained for 1 hour at 70° C., with the reactor pressure at about 460 psig, with stirring.

When polymerization was completed, excess propylene was vented, the contents of the reactor emptied, and polymer samples obtained for compositional analysis and determination of physical properties, as shown in Tables I and II, below.

Catalyst composition was determined by X-ray fluorescence, productivity was determined by dividing the weight of the product by the weight of catalyst, and normalizing the result for a one hour reaction time in cases where the run time was not one hour. Bulk density was determined by weighing the amount of product In the case of Catalyst G, runs were carried out at hydrogen ΔP of 100 and 125 psi in addition to 70 psi, for comparative purposes as shown in Table IV, below.

EXAMPLE 2

Preparation and Testing of Catalysts Utilizing an Alkoxymagnesium Chloride Compound Four catalysts, designated H–K, were prepared using 2-methylpentoxymagnesium chloride as the magnesium source, and HCl, silicon tetrachloride, or a silicon tetrachloride/trichlorosilane mixture as a magnesium fixing agent, with and without washing. The compositions of the catalysts were analyzed, and Catalyst K was tested in propylene homopolymerization as described below.

Catalyst Preparation Procedure

Catalyst H

This catalyst was prepared following the general procedure of Catalyst A, above. 5. grams Grace 332 silica was added to the flask followed by 25.6 mL of a 17.2 wt. % heptane solution of 2-methylpentoxymagnesium chloride, a small amount of heptane was added, and the mixture was refluxed for 30 minutes at 97° C. A temperature rise of 4° C. was noted upon the addition of the magnesium compound. The mixture was then cooled to 40° C., and 15 grams HCl was bubbled through the mixture from a lecture bottle for 1½ hours. No temperature rise was noted. A very light pink supernatant precursor was observed. The solid was off white.

2.46 mL ethanol was added and refluxed for 1 hour at 97° C. A temperature rise of 5° C. was noted upon addition of the ethanol. In this case, the supernatant was pale yellow with an off white precursor solid. The mixture was cooled to less than 40° C. and 23 mL TiCl$_4$ was added. Heating was started and 1.68 mL DBP was added at 80° C. The mixture was reacted for 1 hour at 100° C. The supernatant was removed and the solid product was transferred to an extractor and extracted for 3½ hours with 10 vol. % TiCl$_4$ in ethylbenzene at 120°-125° C. The solid product was then washed with heptane and transferred to a dry box for further evaluation.

Catalyst I

This catalyst was prepared according to the procedure of Catalyst H, except that 2.4 mL SiCl+ was added in place of HCl.

Catalyst J

This catalyst was prepared according to the procedure of Catalyst I, except that after addition of SiCl$_4$, refluxing, and cooling, the product was washed twice with 70 mL clean heptane.

Catalyst K

In this case, the catalyst was prepared according to the procedure of Catalyst J, except that 2.0 mL SiCl$_4$ and 0.35 mL HSiCl$_3$ were substituted for 2.4 mL SiCl$_4$. Compositional analyses of Catalysts H through K are shown in Table III, below.

Polymerization Testing

Catalyst K was polymerized according to the procedure described above, except that the $\Delta P$ for the hydrogen addition was 140 psi rather than 70 psi.

Table IV shows the results of polymerization of Catalysts F and G using 70 psi H$_2$ $\Delta P$ (from Table II), Catalyst G at 100 and 125 psi H$_2$ $\Delta P$ and Catalyst K at 140 psi H$_2$ $\Delta P$. Results are shown in Table IV, below.

TABLE III

Effect of Treatment (X) on Catalyst Composition
SiO$_2$/ROMgCl/X/EtOH/TiCl$_4$/DBP/(TiCl$_4$/EB Extraction)

| Catalyst | Composition, Wt. % | | | | Mg/Ti (Molar) |
|---|---|---|---|---|---|
| | Ti | Mg | SiO$_2$ | Cl | |
| H | 5.13 | 4.38 | 58.6 | 12.9 | 1.7 |
| I | 4.76 | 3.70 | 34.0 | 20.1 | 1.5 |
| J | 3.45 | 4.06 | 36.1 | 14.4 | 2.3 |
| K | 5.19 | 3.36 | 61.5 | 14.3 | 1.4 |

TABLE IV

Effect of Hydrogen on Polymer Properties

| Catalyst | Weight Cat. (g) | Productivity (g/g-cat/hr.) | Bulk Density (lb/ft$^3$) | H$_2\Delta$P (psi) | Melt Flow (g/10 min.) | HI (wt. %) | Polymer Ti (ppm) |
|---|---|---|---|---|---|---|---|
| F | 0.0429 | 6300 | 19.0 | 70 | 12.1 | 97.2 | 7.4 |
| G | 0.0310 | 10927 | 23.0 | 70 | 1.4 | 99.3 | 3.3 |
| G | 0.0074 | 18273 | 19.8 | 100 | 16.8 | 97.5 | 2.5 |
| G | 0.0015 | 30000* | 19.3 | 125 | 30.9 | 97.5 | 1.4 |
| K | 0.0078 | 10960 | 23.6 | 140 | 50.1 | 96.9 | 4.9 |

*A productivity of 46,720 g/g/hr was observed, but is subject to a relatively high degree of error at low catalyst weight. Productivities of greater than 30,000 g/g/hr are reproducible for this catalyst at these conditions.

RESULTS AND DISCUSSION

The data in Tables I and III summarize the effects of the reagents used in place of HCl on the composition of the final catalyst. Inspection of the data in Table I shows that the Mg/Ti molar ratio relative to Catalyst A varies widely dependent on the reagents and conditions. It can be seen from the data in Table II that the performance of the catalyst under substantially uniform propylene polymerization conditions also varies over a wide range.

Catalysts C and G of Table I exhibited high titanium efficiencies but the overall performance of Catalyst G (See Table II) was superior. The use of HSiCl$_3$ alone (Catalyst D) gave the poorest performing catalyst. Catalyst D (Table III) indicates that the use of HCl with SiCl$_4$ produced high melt flow at the tested conditions but at lower productivity. Unique changes were obviously being made in the catalyst that caused it to be more responsive to polymerization parameters, and the synergistic influence of HSiCl$_3$ on SiCl$_4$ was very pronounced.

Table IV demonstrates the increased sensitivity of the inventive catalysts to hydrogen. Catalyst G clearly showed a dramatic effect on productivity as hydrogen is increased. (The productivity was determined by the weight of catalyst charged to the reactor.) Catalyst K, though reaching a high melt flow with 96.9% HI did not exhibit as high a productivity as the corresponding dialkylmagnesium compound-based Catalyst G.

EXAMPLE 3

Direct Production of High Melt Flow Polypropylene

Catalyst L was prepared following the general procedure of the foregoing examples, using 5.0 g Grace 332 silica; 31.7 mL of a 20 wt. % solution of BOMAG; 2.72 mL SiCl$_4$ and 0.40 mL HSiCl$_3$ as the magnesium fixing agent, with two heptane washes after the magnesium fixing step; 4.87 mL ethanol; 22 mL TiCl$_4$; and 1.68 mL DBP. Intermediate products were not washed, except as noted above.

A catalyst comprising 52.7 wt. % silica, 4.74 wt. % titanium, 4.40 wt. % magnesium, and 14.8 wt. % chlorine was produced.

0.0037 g of this catalyst was tested in propylene homopolymerization in a two liter reactor at a hydrogen $\Delta P$ of 140 psi using 1.6 mL of a 25.4 wt. % solution of TEA and 0.20 mL IBIP, at 70° C. and 460 psig. The observed productivity was 30,584 g/g-cat/hr, with product MF=312.9 g/10 min., a bulk density of 23.1 lb/ft:, and 91.1 %HI. The product contained 5.5 ppm titanium. (The observed high productivity is inconsistent with the observed high residual titanium content of the product, and is probably due to high degrees of experimental error.)

EXAMPLE 4

Effect of Aluminum/Titanium Ratio on Catalyst Performance

Catalyst G was tested in propylene homopolymerization (bulk propylene) at 70° C. and 460 psig for 1 hour (with two exceptions) with a H$_2$ $\Delta P$ of 70 psi using a TEA/IBIP cocatalyst, with the molar ratio of TEA to titanium varying from 50 to 630. (The molar ratio of TEA to IBIP remairied constant at 10:1.) The results are shown in Table V, below.

TABLE V

| Al:Ti (Molar) | Polymer Ti (ppm) | M.F. (g/10 min.) | % HI (wt. %) |
|---|---|---|---|
| 60 | 3.8$^a$ | <0.1 | 99.2 |
| 110 | 3.3 | 1.4 | 99.3 |

TABLE V-continued

| Al:Ti (Molar) | Polymer Ti (ppm) | M.F. (g/10 min.) | % HI (wt. %) |
|---|---|---|---|
| 230 | 4.0[b] | 4.3 | 98.5 |
| 450 | 2.0 | 8.2 | 98.2 |
| 570 | 2.9 | 2.1 | 98.8 |
| 630 | 2.6 | 2.7 | 99.1 |

[a] 50 minute run, normalized to 1 hour.
[b] 30 minute run, not normalized to 1 hour.

This example demonstrates increasing productivity for the catalyst, as evidenced by a general trend of decreasing residual titanium in the product, with increases in the aluminum to titanium ratio. The product MF and %HI remained substantially uniform.

The foregoing detailed description is given for clearness of understanding only, and no unnecessary limitations should be understood therefrom, as modifications within the scope of the invention will be apparent to those skilled in the art.

What is claimed is:

1. A method of polymerizing one or more polymerizable 1-olefins, said method comprising the step of polymerizing said 1-olefin or 1-olefins under polymerizing conditions in the presence of a catalyst system comprising an alkylaluminum cocatalyst and a solid catalyst component prepared by a method comprising the steps of:
    (a) contacting particulate, porous silica of the formula $SiO_2 \cdot aAl_2O_3$ where a is in the range of 0 to about 2 with a hydrocarbon-soluble organomagnesium compound selected from the group consisting of hydrocarbon-soluble dialkyl magnesium compounds, alkoxymagnesium halides, dialkoxymagnesium compounds, and alkylalkoxymagnesium compounds in the presence of an inert liquid hydrocarbon to produce a solid product;
    (b) contacting the solid product of step (a) with a magnesium fixing agent comprising $SiCl_4$ at a temperature less than about 70° C.;
    (c) contacting the solid product of step (b) with a $C_1$-$C_8$ alkanol in a molar ratio of alkanol to magnesium in the range of about 1 to about 5, inclusive;
    (d) contacting the solid product of step (c) with $TiCl_4$; and,
    (e) contacting the solid product of step (d) with a carboxylic acid derivative selected from the group consisting of alkyl, aryl, and cycloalkyl carboxylic acid dichlorides, anhydrides and diesters; or,
    (d') contacting the solid product of step (c) with a carboxylic acid derivative selected from the group consisting of alkyl, aryl, and cycloalkyl carboxylic acid dichlorides, anhydrides and diesters; and,
    (e') contacting the solid product of step (d') with $TiCl_4$; or,
    (d") contacting the solid product of step (c) with $TiCl_4$ and a carboxylic acid derivative selected from the group consisting of alkyl, aryl, and cycloalkyl carboxylic acid dichlorides, anhydrides and diesters;
    (f) subsequently subjecting the solid product of step (e), step (e') or step (d") to extraction with an extraction liquid comprising $TiCl_4$ at a temperature of greater than about 100° C. for about 1 to 3 hours to produce a solid product; and,
    (g) isolating said solid product of step (f).

2. The method of claim 1 wherein said cocatalyst comprises an aluminum component of the formula $AlR^2_n$ wherein each $R^2$ is independently an alkyl group of 8 or fewer carbon atoms, and a silane component of the formula $R^3_n Si(OR^4)_{4-n}$ where $R^3$ is selected from the group consisting of saturated alphatic, cycloaliphatic, and aromatic hydrocarbon radicals of 16 or fewer carbon atoms, $R^4$ is an alkyl group of 15 or fewer carbon atoms, and n is 0 to 3, inclusive.

3. The method of claim 2 wherein the atomic ratio of titanium from said solid catalyst component to aluminum from said aluminum component is in the range of about 1:10 to about 1:2000, inclusive, and the molar ratio of said aluminum component to said silane component is from about 1:0.01 to about 1:0.8.

4. The method of claim 3 wherein said aluminum component is a trialkylaluminum component and said silane component is selected from the group consisting of trialkoxyalkylphenyl silanes and dialkyldiethylphenyl silanes.

5. The method of claim 4 wherein said aluminum component is triethylaluminum and said silane component is isobutylisopropyldimethoxy silane.

6. The method of any one of claims 2, 3, 4, or 5 wherein said 1-olefin comprises a major molar proportion of propylene.

7. The method of claim 1 wherein said polymerization is carried out in the presence of molecular hydrogen.

8. The method of claim 1 wherein said polymerization is carried out at about 20 to about 160° C. at about 1 to about 100 bar.

9. The method of claim 1 wherein said hydrocarbon-soluble organomagnesium compound is selected from the group consisting of hydrocarbon-soluble organomagnesium compounds of the formula $MgRR^1$, $ROMgX$, $Mg(OR)(OR^1)$, and $R(OR^1)Mg$, wherein R and $R^1$ are the same or different substituted or unsubstituted $C_2$-$C_{12}$ alkyl groups, and X is I, Br, or Cl.

10. The method of claim 9 wherein said organomagnesium compound is $MgRR^1$ or $ROMgCl$.

11. The method of claim 1 wherein said magnesium fixing agent of step (b) additionally comprises HCl, $HSiCl_3$, or $H_2SiCl_2$.

12. The method of claim 1 wherein said magnesium fixing agent of step (h) comprises a mixture of $SiCl_4$ and $HSiCl_3$.

13. The method of claim 12 wherein the solid product of step (b) is washed prior to step (c).

14. The method of claim 1 wherein said carboxylic acid derivative of step (e), step (d') or step (d") is a phthalic acid derivative of the formula

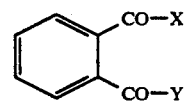

wherein X and Y together are oxygen or X and Y are each chlorine or $C_1$-$C_{10}$ alkoxy groups.

15. The method of claim 1 wherein the molar ratio of said magnesium fixing agent to magnesium in step (b) is at least about 1:1.

16. The method of claim 15 wherein said organomagnesium fixing agent comprises a mixture of $SiCl_4$ and either $HSiCl_3$ or liquid $H_2SiCl_2$.

17. The method of claim 16 wherein said organomagnesium fixing agent comprises $SiCl_4$ and a minor molar proportion of gaseous HCl or gaseous $H_2SiCl_2$.

18. The method of claim 1 wherein the molar ratio of said alkanol of step (c) to magnesium is in the range of about 2.5:1 to about 3.5:1.

19. The method of claim 1 wherein said extraction step (f) is carried out at a temperature in the range of about 100° C. to about 150° C.

20. The method of claim 1 wherein the molar ratio of said organomagnesium compound to said silica in step (a) is about 0.1:1 to about 1:1, inclusive; the molar ratio of said magnesium fixing agent to magnesium in step (b) is at least about 1:1; the molar ratio of said TiCl$_4$ to magnesium in step (d), step (e') or step (d") is in the range of about 2:1 to about 20:1, inclusive; the molar ratio of said carboxylic acid derivative to magnesium in step (e), step (d') or step (d") is in the range of about 0.01:1 to about 1:1, inclusive; and the weight ratio of said extraction liquid to said product of step (e), step (e') or step (d") in step (f) is in the range of about 1:1 to about 100:1, inclusive.

21. The method of claim 20 wherein said silica and organomagnesium compound of step (a) are contacted at about 10° to about 120° C. and maintained at about 20° to about 140° C. for about 0.5 to about 5 hours; step (b) is carried out at about 35° to about 45° C. for about 0.5 to about 5 hours; step (c) is carried out at about 20 to about 140° C. for about 0.5 to about 5 hours; step (d) is initiated at about room temperature and maintained at about 10° to about 150° C. for about 0.5 to about 5 hours; and, step (e) is initiated at about 90° C. and maintained at about 100° C. for about 0.5 to 5 hours; and, step (e') is initiated at room temperature and maintained at about 10° to about 150° C. for about 0.5 to about 5 hours.

22. The method of claim 21 wherein said organomagnesium compound is selected from the group consisting of butyloctyl magnesium and 2-methylpentoxymagnesium chloride, said magnesium fixing agent is SiCl$_4$ and a minor molar proportion of HSiCl$_3$, said alkanol is ethanol, said carboxylic acid derivative is dibutyl phthalate, said extraction liquid comprises TiCl$_4$ and ethylbenzene, and the product of step (b) is washed prior to step (c).

23. The method of claim 1 wherein the isolated solid product of step (g) is washed with an inert liquid hydrocarbon to remove free TiCl$_4$ therefrom.

24. A method of polymerizing one or more polymerizable 1-olefins, said method comprising the step of polymerizing said 1-olefin or 1-olefins under polymerizing conditions in the presence of a catalyst system comprising a suitable cocatalyst and a solid catalyst component prepared by a method including the steps of contacting silica with a hydrocarbon soluble organomagnesium compound to produce a first solid product; contacting the first solid product with an alcohol to produce a second solid product; and contacting the second solid product with a carboxylic acid derivative and with TiCl$_4$ to produce the solid catalyst component, wherein the first solid product is contacted with SiCl$_4$ to fix a magnesium component in the first solid product prior to contact with TiCl$_4$.

* * * * *

UNITED STATES PATENT AND TRADEMARK OFFICE
CERTIFICATE OF CORRECTION

PATENT NO. : 5,182,341

DATED : January 26, 1993

INVENTOR(S) : Albert P. Masino

Page 1 of 2

It is certified that error appears in the above-identified patent and that said Letters Patent is hereby corrected as shown below:

On the title page, after item [75] Inventor: insert the following: --[73] Assignee: Quantum Chemical Corporation, Cincinnati, Ohio--.

Column 3, line 4, delete ":".

Column 3, line 14, "$C_1-C_0$" should read --$C_1-C_9$--.

Column 3, line 39, "10°-20°" should read --10°-120°--.

Column 4, line 47, "SiCl<" should read --$SiCl_4$--.

Column 4, line 64, "1.2" should read --1-2--.

Column 6, line 35, "(TEA ?" should read --(TEA)--.

Column 9, line 36, "A G" should read --A-G--.

Column 9, line 49, after "container." insert --The procedure was as follows.--.

Column 9, line 52, delete "solution" (second occurrence).

Column 11, line 7, "SiCl+" should read --$SiCl_4$--.

Column 12, line 62, delete "remairied" and insert --remained--.

Column 14, line 44, delete "(h)" and insert --(b)--.

Column 15, line 29, delete "90°C" and insert --80°C--.

UNITED STATES PATENT AND TRADEMARK OFFICE
CERTIFICATE OF CORRECTION

PATENT NO. : 5,182,341
DATED : January 26, 1993
INVENTOR(S) : Albert P. Masino

It is certified that error appears in the above-indentified patent and that said Letters Patent is hereby corrected as shown below:

Column 15, line 30, after "hours;" insert --or, step (d') is initiated at room temperature, and maintained at about 100°C for about 0.5 to 5 hours;--.

Signed and Sealed this

First Day of November, 1994

Attest:

BRUCE LEHMAN

Attesting Officer        Commissioner of Patents and Trademarks